(12) United States Patent
Ma et al.

(10) Patent No.: US 9,811,390 B1
(45) Date of Patent: Nov. 7, 2017

(54) CONSOLIDATING TASKS INTO A COMPOSITE REQUEST

(71) Applicant: EMC Corporation, Hopkinton, MA (US)

(72) Inventors: Vincent Ma, Shanghai (CN); James Pendergraft, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/673,677

(22) Filed: Mar. 30, 2015

(51) Int. Cl.
*G06F 9/46* (2006.01)
*G06F 9/52* (2006.01)
*G06F 9/48* (2006.01)
*H04L 29/08* (2006.01)

(52) U.S. Cl.
CPC .............. *G06F 9/52* (2013.01); *G06F 9/46* (2013.01); *G06F 9/4881* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,424,427 B1 * | 7/2002 | Herriot | ................ | H04L 67/02 358/1.15 |
| 6,993,525 B1 * | 1/2006 | Imago | ............... | G06F 17/30887 |
| 7,107,310 B2 * | 9/2006 | McCarthy | ............. | H04L 63/029 709/203 |
| 7,107,357 B2 * | 9/2006 | Cooper | ................... | H04L 67/02 709/203 |
| 7,376,955 B1 * | 5/2008 | Forman | ................ | G06F 9/4843 709/201 |
| 7,584,454 B1 * | 9/2009 | Massoudi | ............... | G06F 9/466 707/999.202 |
| 7,693,994 B2 * | 4/2010 | Matsushima | ........... | H04L 67/16 709/202 |
| 7,734,515 B1 * | 6/2010 | Frederick | ................ | G06F 9/465 705/26.1 |

(Continued)

FOREIGN PATENT DOCUMENTS

EP 2608487 A1 6/2013

OTHER PUBLICATIONS

Hamadi et al. "A Petri Net-based Model for Web Service Composition" copyright 2003, Australian Compuer Society, Inc. (Hamadi_2003.pdf; pp. 1-10).*

(Continued)

*Primary Examiner* — Hiren Patel
(74) *Attorney, Agent, or Firm* — BainwoodHuang

(57) ABSTRACT

Described are techniques for consolidating tasks into a composite job. A server processes a composite request to create a composite job on the server. The composite request comprises a plurality of nested job create requests. The composite job comprises a plurality of jobs. Each job in the plurality of jobs corresponds to a job create request in the plurality of nested job create requests. The server generates a dependency tree indicating a dependency of each job in the plurality of jobs. The server executes the composite job in accordance with the dependency tree. On determining that a first job is dependent on a second job, the server executes the second job prior to executing the first job. The server passes the output of the second job as input to the first job.

20 Claims, 9 Drawing Sheets

(56) References Cited

U.S. PATENT DOCUMENTS

| | | | | |
|---|---|---|---|---|
| 7,853,643 | B1* | 12/2010 | Martinez | H04L 29/06 709/201 |
| 8,209,701 | B1* | 6/2012 | Roytman | G06F 9/5027 718/106 |
| 2002/0065850 | A1* | 5/2002 | Baudu | G06F 17/21 715/234 |
| 2002/0138321 | A1* | 9/2002 | Yuan | G06Q 10/10 705/80 |
| 2003/0105774 | A1* | 6/2003 | Oldham | G06F 17/30887 |
| 2004/0117124 | A1* | 6/2004 | Kiros | G01N 15/1475 702/19 |
| 2005/0080661 | A1* | 4/2005 | Casati | G06Q 30/02 709/224 |
| 2005/0162706 | A1* | 7/2005 | Eguchi | H04N 1/00204 358/442 |
| 2005/0177541 | A1* | 8/2005 | Wright | G06F 17/30011 |
| 2005/0187941 | A1* | 8/2005 | Kanasaki | G06F 17/3089 |
| 2006/0015873 | A1* | 1/2006 | Dettinger | G06F 9/5038 718/102 |
| 2006/0107265 | A1* | 5/2006 | Schulz | G06Q 10/06 718/100 |
| 2006/0218551 | A1* | 9/2006 | Berstis | G06F 9/4881 718/102 |
| 2006/0271884 | A1* | 11/2006 | Hurst | G06F 17/30716 715/854 |
| 2007/0050759 | A1* | 3/2007 | Boing | G06F 19/3412 717/135 |
| 2007/0277174 | A1* | 11/2007 | Cai | G06F 9/5038 718/101 |
| 2008/0049244 | A1* | 2/2008 | Pangrazio | G06Q 10/10 358/1.15 |
| 2008/0114882 | A1* | 5/2008 | Christenson | H04L 69/162 709/228 |
| 2008/0163218 | A1* | 7/2008 | Ostermeier | G06F 9/4843 718/101 |
| 2009/0070772 | A1* | 3/2009 | Shikano | G06F 9/5027 718/106 |
| 2009/0217287 | A1* | 8/2009 | Blum | G06F 9/44521 718/105 |
| 2010/0132014 | A1* | 5/2010 | Montagut | G06F 9/5038 726/1 |
| 2010/0211815 | A1* | 8/2010 | Mankovskii | G06F 11/0709 714/2 |
| 2010/0262948 | A1* | 10/2010 | Melski | G06F 8/71 717/101 |
| 2012/0272245 | A1* | 10/2012 | Ryman | G06F 9/5027 718/100 |
| 2012/0303818 | A1* | 11/2012 | Thibeault | G06F 9/5072 709/226 |
| 2013/0013668 | A1* | 1/2013 | Kodaka | H04L 67/1004 709/203 |
| 2013/0013760 | A1* | 1/2013 | Quinet | H04L 67/02 709/223 |
| 2013/0139164 | A1* | 5/2013 | Balko | G06F 8/35 718/102 |
| 2013/0262696 | A1* | 10/2013 | Watanabe | H04L 45/00 709/238 |
| 2014/0181826 | A1* | 6/2014 | Wolf | G06F 9/4843 718/102 |
| 2014/0282082 | A1* | 9/2014 | Stollarski | H04L 51/34 715/752 |
| 2014/0344403 | A1* | 11/2014 | Arnault | H04L 67/32 709/217 |
| 2015/0019353 | A1* | 1/2015 | Warrum | G06Q 30/0277 705/14.73 |
| 2015/0128150 | A1* | 5/2015 | Ueda | G06F 9/5066 718/105 |
| 2015/0134734 | A1* | 5/2015 | Bishop | H04L 67/303 709/203 |
| 2016/0041847 | A1* | 2/2016 | Fang | G06F 17/30 718/103 |
| 2016/0062794 | A1* | 3/2016 | Charania | G06F 17/30923 718/102 |

OTHER PUBLICATIONS

Christensen et al. "Web Services Description Language (WSDL) 1.1", W3C note Mar. 15, 2001, (WSDL_2009.pdf; pp. 1-28).*

James, Paul, "A RESTful Web service, an example", Retrieved at <<http://www.peej.co.uk/articles/restfully-delicious. Feb. 5, 2015, 11 pages.

* cited by examiner https://10.108.53.29/api/types/job/instances?timeout=0

```
{
    "description": "lunWizard",
    "tasks": [{
            "name": "poolStep",
            "object": "pool",
            "action": "create",
            "parametersIn": {
                    "name": "test_pool",
                    "diskGroups": [{
                            "id": "dg_19"
                    }],
                    "diskGroupNumDisks": [5],
                    "raidTypes": [1],
                    "stripeWidths": [0]
            }
    },
    {
        "name": "snapScheduleStep",
        "object": "snapSchedule",
        "action": "create",
        "parametersIn": {
        "name": "test_schedule",
        "rules": [{
                "type": 1,
                "hours": [8],
                "isAutoDelete": true,
                "interval": 8,
                "minute": 0,
                "accessType": 1
        }]
        }
    },
    {
        "name": "lun1Step",
        "object": "storageResource",
        "action": "createLun",
        "parametersIn": {
                "name": "test_lun1",
                "snapScheduleParameters": {
                    "snapSchedule": "@snapScheduleStep.id"
                },
                "lunParameters": {
                        "pool": "@poolStep.id",
                        "size": 1073741824
                }
        }
    }
    ]
}
```

┌──https://10.108.53.29/api/instances/job/B-17?fields=tasks,progressPct,state,elapsedTime
 602        {
              "content":
              {
 604    ┌──────"elapsedTime": "00:01:46.955",
        ┌──────"progressPct": 100,
 606    ┌──────"tasks":
              [
 608        {
              "action": "create",
              "object": "snapSchedule",
              "name": "snapScheduleStep",
              "state": 2,
              "parametersOut":         ── 632
              {
                "id": "snapSch_5"
              },
              "parametersIn":
              {
                "name": "test_schedule",
                "rules":
                [
 610          {
                "type": 1,
                "hours":
                [
                  8
                ],
                "isAutoDelete": true,
                "interval": 8,
                "minute": 0,
                "accessType": 1
              }
              ]
              }
              },
```

```
{
    "action": "create",
    "object": "pool",
    "name": "poolStep",      ─── 618
    "state": 2,
    "parametersOut":
    {
        "id": "pool_13"
    },
    "parametersIn":
    {
        "name": "test_pool",
        "diskGroups":
        [                    ─── 634
            {
                "id": "dg_19"
            }
        ],
        "diskGroupNumDisks":
        [
            5
        ],
        "raidTypes":
        [
            1
        ],
        "stripeWidths":
        [
            0
        ]
    }
},
{
    "action": "createLun",
    "object": "storageResource",
    "name": "lun1Step",
    "state": 2,
    "parametersOut":         ─── 622
    {
        "storageResource":
        {
            "id": "sv_36"
        }
    },
    "parametersIn":
    {
        "name": "test_lun1",
        "snapScheduleParameters":
        {                    ─── 626
            "snapSchedule":
            {
                "id": "snapSch_5"
            }
        },
        "lunParameters":
        {
            "pool":          ─── 628
            {
                "id": "pool_13"
            },
            "size": 1073741824
        }
    }
}
],                           ─── 630
"id": "B-17",
"state": 4
}
}
```

616 braces the first block (create pool)
620 braces the second block (createLun)
624 braces parametersIn of second block

FIG. 6B

CONSOLIDATING TASKS INTO A COMPOSITE REQUEST

BACKGROUND

A representational state transfer (REST) application programming interface (API) is a software architecture style associated with a client-server model. A uniform interface separates clients and servers. A REST API is stateless. Each request from a client includes the information necessary for the server to service the request. In other words, the necessary state to handle the request is included within the request itself, whether as part of the URI, headers, query-string parameters, or body.

The uniform resource identifier (URI) uniquely identifies the resource and the body contains the state (or state change) of that resource. After the server processes the request, the piece(s) of state data that matter are communicated back to the client via headers, status, and/or the body of a response returned to the client.

A client may send a job request, in accordance with a REST API, for a basic operation or task to be performed by a server. A given request may specify a single operation or task. In response to receiving the request, the server may perform processing to service the request.

SUMMARY

Examples of the disclosure provide for executing tasks in a composite job. In an example, a computer-implemented method for implementing a composite job create request is provided. A composite request is received by a computing device. The composite request includes a plurality of nested job requests encapsulated within a body of the composite request. Each nested job request in the plurality of nested job requests includes a set of parameters defining an individual job to be performed. A composite job corresponding to the composite request is created. The composite job includes a plurality of jobs. A dependency tree is generated based on the data flow between the individual jobs in the plurality. Each job in the plurality of jobs associated with the composite job is executed, by a processing device, in accordance with the dependency tree.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is an exemplary composite request.

FIGS. 6A and 6B is an exemplary composite job instance.

Corresponding reference characters indicate corresponding parts throughout the drawings.

DETAILED DESCRIPTION

Figure 1:
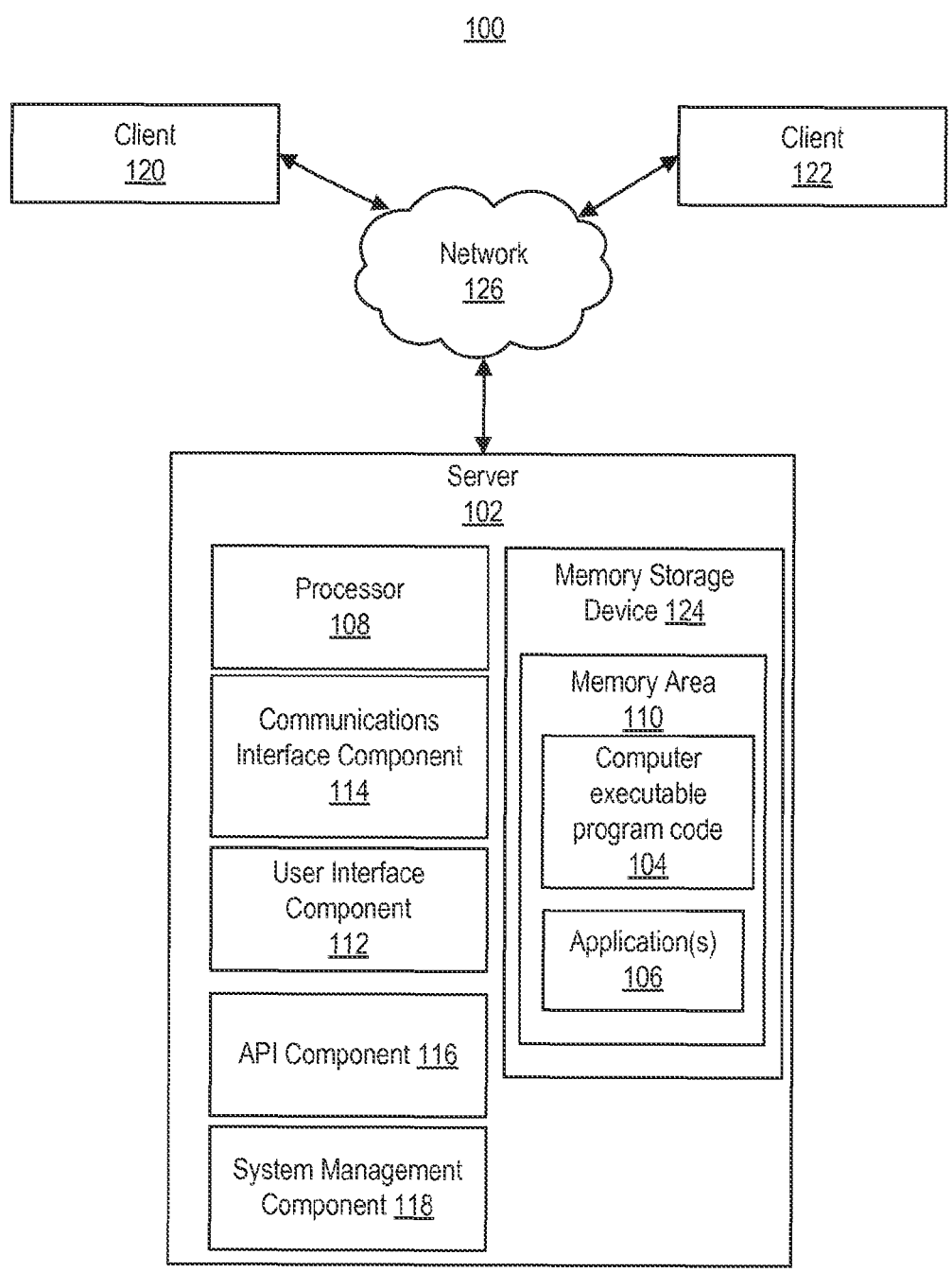
FIG. 1 is an exemplary block diagram illustrating a system for implementing composite requests.

A client may send a job create request via an application programming interface (API) for a single task or operation to be performed by a server. A client may send more than one job create request to the same server. In such cases, the client must create a separate job task request for each operation or task and transmit each job request to the server as a separate request. In addition, the client must track each job request separately and receive status updates for each task separately.

Generating and tracking multiple separate job requests is inefficient and time consuming for the client. Moreover, these multiple separate job tasks create additional complexity for the client separately monitoring each of these individual tasks.

Moreover, if one job requires output from another job, the user must manually feed the output from the first job to the second job at the client. This process is burdensome for a user and may incur a performance penalty for the client due to the number of requests and responses that are sent back and forth between the client and server.

Referring to the figures, examples of the disclosure enable a composite job request which enables multiple individual tasks or operations to be encapsulated within a body of the composite job request. In other words, task create requests are grouped together into a composite request. This composite request enables a user to send multiple job create requests to a server via a single, consolidated job create request which reduces usage of network bandwidth, conserves memory, reduces processor load, increases reliability, and saves time by permitting a user to create and send a single job create request to the server instead of creating and sending multiple separate job create requests.

Once created, the composite request is sent to a server. The composite request is processed on the server to create a composite job. The composite job includes two or more tasks. The composite job has a single composite job identifier which may be used to track or monitor execution of the composite job. The user may request a status update of all individual tasks associated with the composite job by sending a single status update request with the composite job identifier to the server. This composite job identifier permits a user to obtain a status of each individual task using a single request instead of sending multiple separate status update requests for each individual task associated with the composite job.

Thus, the single composite job, composite job identifier, and composite job status increases processing speed, conserves memory, increases reliability, and reduces network bandwidth usage by reducing the number of requests and responses are transmitted between the client and server. Consolidating two or more tasks into a single composite request frees the client from managing individual tasks and their relationships manually which further enables more efficient communication between the client and server and improves user interaction with the client and server. It also frees the client from managing recovery of partially complete multi-step operations, when interrupted by client or network failures. This increases reliability.

Referring to FIG. 1, an exemplary block diagram illustrates a system 100 for implementing composite requests. In the example of FIG. 1, the data processing system represents a system for responding to REST API composite job requests received from one or more clients. In this non-limiting example, system 100 includes a server-client network. However, aspects of the disclosure are not limited to networked systems.

The server 102 is a computing device executing computer executable program code 104 (e.g., as application(s) 106, operating system functionality, or both) to implement the operations and functionality associated with the server 102. The server 102 may include a web server, an application server, a file server, a back-end server, a cloud server, or any other type of server.

In another example, the server 102 is a server associated with a data storage system. In still another example, the server 102 may be any type of computing device for request processing. In yet another example, server 102 may represent a group of processing units or other computing devices.

In some examples, the server 102 includes at least one processor 108, a memory area 110 associated with a memory storage device 124, and at least one user interface component 112. The processor 108 includes any quantity of processing units, and is programmed to execute computer executable program code 104 for implementing aspects of the disclosure. The computer executable program code 104 may be performed by the processor 108 or by multiple processors within the server 102, or performed by a processor external to the server 102. In some examples, the processor 108 is programmed to execute computer executable program code 104 such as those illustrated in the figures (e.g., FIG. 9 and FIG. 10).

In some examples, the processor 108 represents an implementation of analog techniques to perform the operations described herein. For example, the operations may be performed by an analog computing device and/or a digital computing device.

The server 102 further has one or more computer readable media such as the memory area 110. The memory area 110 includes any quantity of media associated with or accessible by the server 102. The memory area 110 may be internal to the server 102 (as shown in FIG. 1), external to the server (not shown), or both (not shown). In some examples, the memory area 110 includes read-only memory (ROM) and/or memory wired into an analog computing device.

The memory area 110 stores, among other data, the computer executable program code 104 and the one or more application(s) 106. The application(s) 106, when executed by the processor 108, operate to perform functionality on the server 102. Exemplary application(s) 106 include, without limitation, mail server application programs, web services, address book services, messaging services, media services, location-based services, search programs, and the like. The applications may communicate with counterpart applications or services such as web services accessible via a network 126. For example, the applications may represent server-side applications executing in a cloud that correspond to downloaded client-side services.

The server 102 may further include one or more computer executable components. Exemplary components include, without limitation, a communications interface component 114, an application programming interface (API) component 116, and a system management component 118. In this example, components, such as communications interface component 114, API component 116, and system management component 118 are separate components from application(s) 106. However, in other examples, the communications interface component 114, API component 116, and system management component 118, are included within application(s) 106 of memory area 110.

API component 116 receives queries from clients and returns responses to the clients. In this non-limiting example, API component 116 is a representational state transfer (REST) API. However, the disclosure is not limited to REST API implementations.

API component 116, in this example, supports a special kind of request called a composite request that enables a client to group several active management requests together into one request and track/manipulate them as whole. The composite request frees client side from managing individual requests and their relationships, and is especially useful in scenarios such as, but not limited to, graphical user interface (GUI) wizards, or repeated similar actions like deleting one-hundred (100) logical units (LUNs).

In some examples, the communications interface component 114 includes a network interface card and/or computer executable program code (e.g., a driver) for operating the network interface card. Communication between the server 102 and other devices, such as client 120 and client 122, may occur using any protocol or mechanism over any wired or wireless connection.

In some examples, the user interface component 112 includes a graphics card for displaying data to the user and receiving data from the user. The user interface component may also include computer executable program code (e.g., a driver) for operating the graphics card. Further, the user interface component 112 may include a display (e.g., a touch screen display or natural user interface) and/or computer executable program code (e.g., a driver) for operating the display.

The system management component 118 is a system management component that may execute within the server 102. The system management component 118 optionally manages and monitors the server 102. In some examples, the system management component 118 parses composite requests, generates composite jobs, and tracks the execution progress of the composite jobs on the server. The system management component 118 may also receive and/or process composite request status update requests from the client. In response to a client composite request status update, the system management component 118 may return the composite request status to the client via API component 116.

In this example, the server 102 is connected via a network 126 to client 120 and client 122. The network 126 may include any type of network connection. In one example, the network 126 may be the Internet, an intranet, an Ethernet, or other wireless or hardwired connections by which the server 102 may send and receive data associated with one or more clients, such as, but without limitation, client 120 and/or client 122. However, other examples do not require a network 126.

Client 120 and client 122 represents any computing device executing instructions (e.g., as application programs, operating system functionality, or both) to implement the operations and functionality associated with the computing device. For example, client 120 may include a mobile computing device or any other portable device. In some examples, the mobile computing device includes a mobile telephone, laptop, tablet, computing pad, netbook, gaming device, and/or portable media player. The client 120 may also include less portable devices such as desktop personal computers, kiosks, tabletop devices, industrial control devices, wireless charging stations, and electric automobile charging stations. Additionally, the client 120 may represent a group of processing units or other computing devices.

In some examples, the client 120 includes one or more processor(s), a memory area, and at least one user interface. The processor includes any quantity of processing units, and is programmed to execute computer executable program code for implementing aspects of the disclosure. The instructions may be performed by the processor or by multiple processors within the client 120, or performed by a processor external to the client 120.

Client 120 stores one or more applications in a client memory area (not shown). The one or more applications may include an API (not shown) for sending page-to-identifier queries to the server 102. The API at the client may be a REST API.

Other exemplary client-side applications may include mail application programs, web browsers, calendar application programs, address book application programs, messaging programs, media applications, location-based services, search programs, and the like. The applications may communicate with counterpart applications or services associated with server 102, such as web services accessible via the network 126. For example, the applications may represent downloaded client-side applications that correspond to server-side services executing in a cloud.

In the example shown in FIG. 1, the system 100 includes a server 102, a network 126, client 120, and client 122. The system 100 may be implemented as a networked data processing system. However, the disclosure is not limited to a networked system including a server and multiple clients, as shown in FIG. 1.

In one example, the client 120 and server 102 may be implemented within a same computing device without a network connection. In another example, server 102 may be connected via a network to three or more client computing devices.

Figure 2:
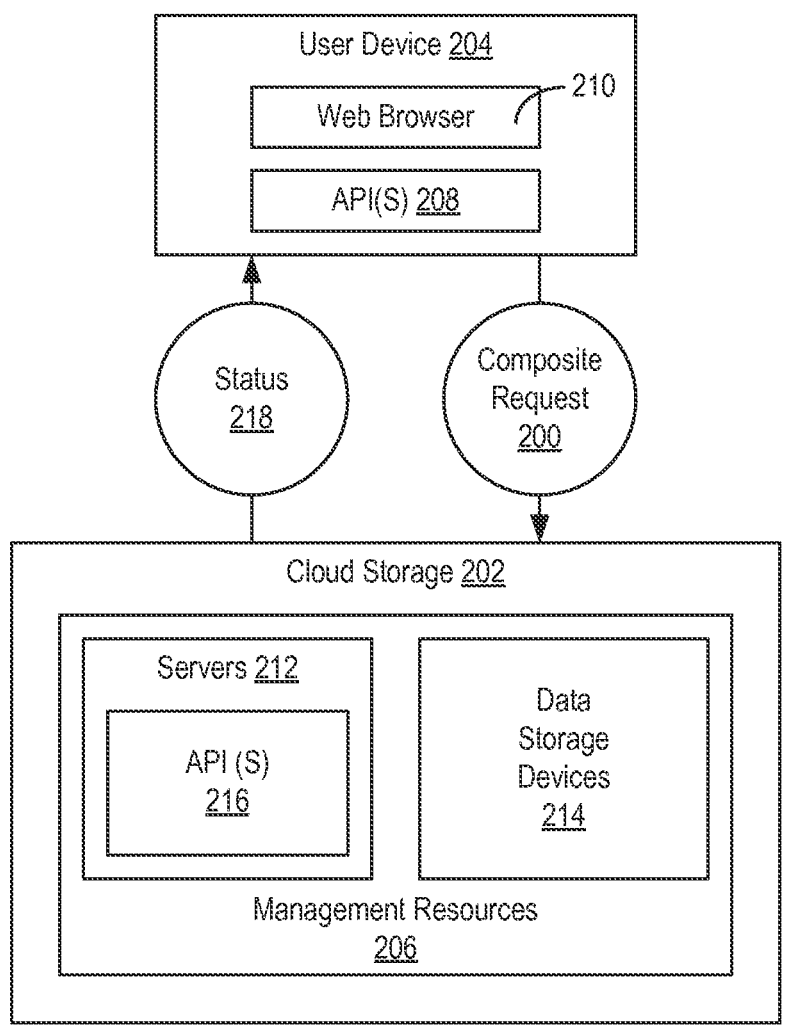
FIG. 2 is an exemplary block diagram illustrating a composite request associated with a cloud storage system.

Referring now to FIG. 2, an exemplary block diagram illustrating a composite request associated with a cloud storage system. Composite request 200 in this example is an API request designed to work on one or more management resources 206 associated with cloud storage 202. A user device 204 accesses cloud storage 202 resources and services via composite request 200.

The composite request 200 includes multiple API requests encapsulated within a body of the composite request 200. Each nested API request encapsulated within the body of the composite request 200 is designed to work on a specific management resource. In this non-limiting example, the composite request 200 encapsulates two or more nested API job-create requests.

The user device generates the composite request 200 in accordance with one or more application programming interfaces (APIs) 208. The user device 204 may be any type of device capable of generating and sending a composite API request, such as, but not limited to, client 120 or client 122 in FIG. 1, shown above. For example, the user device 204 may be a desktop computer, a laptop computer, a tablet computer, a smart phone, or any other type of user device.

Cloud storage 202 is a data storage system including one or more management resources 206. The management resources 206 may include, for example and without limitation, physical data storage devices 214, logical pools, logical units (LUNs), one or more servers 212, and any other hardware or software which may be associated with a cloud storage system.

In some embodiments, the data storage devices 214 may include a data storage array. A data storage array includes a plurality of data storage devices. The data storage devices 214 may also include one or more types of data storage devices, such as, for example, one or more rotating disks drives and/or one or more solid state drives (SSDs).

The user device 204 may access cloud storage 202 resources and services via an application that utilizes one or more API(s) 208, such as, but not limited to, a cloud storage gateway, a web-based content management system, or a web browser. For example, web browser 210 may generate and transmit the composite request 200 to cloud storage 202 via a web service API.

The composite request 200 may include any type of management requests for tasks to be performed on cloud storage 202. For example, but without limitation, the composite request 200 may include tasks associated with setting up a network, creating one or more storage pools, setting up one or more LUNs on one or more storage pools, managing administrative users, setting up service information, creating snap schedules, managing objects, or any other task that may be performed on a data storage system, such as, but not limited to, cloud storage 202.

The one or more server(s) 212 receives the composite request 200 via one or more API(s) 216. In this non-limiting example, API(s) 216 includes a REST API.

The one or more server(s) creates and executes a composite job corresponding to the composite request 200. The one or more server(s) 212 returns a composite job status 218 to the user device 204. The status 218 includes a composite job identifier. The status 218 may also indicate a status of each nested job in the composite job.

Figure 3:
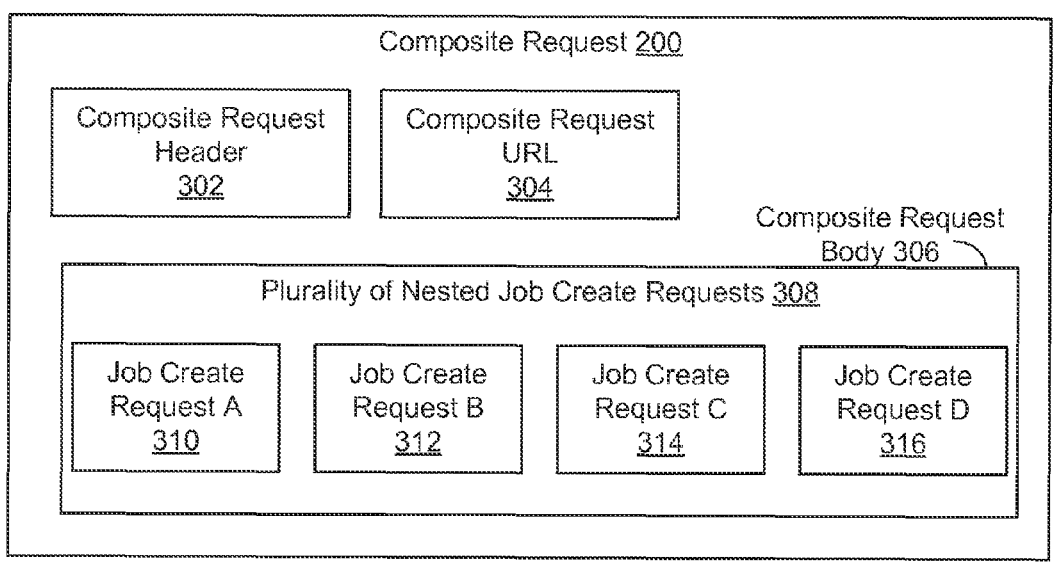
FIG. 3 is an exemplary block diagram illustrating a composite request.

FIG. 3 is an exemplary block diagram illustrating a composite request. A composite request 200 is a request to start a composite job on a server. The composite request encapsulates two or more individual job create request within a body of the composite request.

The composite request 200 enables a user associated with a client to group several active management requests together into one request and track/manipulate them as whole. The composite request 200 may be referred to as a job create action. In some examples, the composite request 200 may be a POST job request. A valid composite request will lead to a composite job created on the server side.

The composite request 200 includes a uniform resource locator (URL) 304, a header 302, and a composite request body. The composite request URL identifies a resource. The composite request header 302 may include a hypertext transfer protocol (HTTP) with a secure socket layer (SSL)/transport layer security (TSL) protocol. HTTP may provide communication encryption and secure identification of a network web server, such as, but without limitation, server 102.

The composite request body 306 encapsulates a plurality of nested job create requests 308. The body 306 contains information for one or more other REST API actions associated with one or more nested job create requests.

The plurality of nested job creates requests 308 is a set of two or more job create requests. Each nested job create request within the composite request body 306 is an individual job request. In this non-limiting example, the plurality of nested job create requests 308 comprises job create request A 310, job create request B 312, job create request C 314, and job create request D 316.

All nested requests in the plurality of nested job create requests 308 share the same HTTP header 302 and URL 304 provided for the composite request 200.

Each nested job create request in the plurality of nested job create requests is wrapped in a jobTaskRequest embedded object. The jobTaskRequest embedded object includes a name parameter, an object parameter, an action parameter, a parameters-in parameter, and a parameters-out parameter.

In some examples, the name parameter for the job task request consists of alphabetic characters, digits and underscore. The name for each nested job create request is be unique within a single composite request.

An object parameter for each nested job created request specifies a target object name of the job task request. An object parameter may specify a target object such as, but without limitation, a pool, a network attached storage (NAS) Server, a LUN, a file server, etc.

An action parameter for each nested job created request specifies target action name of the job task request. A target action name may include, without limitation, create, modify, delete, etc. The action parameter is combined with the object parameter to determine which action the job task request is to invoke. For example, the object parameter and action parameter may specify a "pool.create" to create a pool or "nasServer.modify" indicating the job task to be invoked involves modifying a NAS Server.

In some examples, a parameters-In parameter for each nested job created request is a base-Request type. The base-Request type represents any possible request body for the actions of job task request. Syntactically the value of parameters-In may be a JavaScript® brand scripting language object notation (JSON) object.

The parameters-out parameter indicates the output of a job. More particularly, the parameters-in parameter of a given job is the output generated by execution of a job associated with a nested job create request in the plurality of nested job create requests 308.

In some examples, each individual job create request in the body 306 is encapsulated within a jobTaskRequest embedded object. For example, if a NAS Server.modify action URL is:

/api/instances/nasServer/<id>/action/modify.

The jobTaskRequest embedded object instance for the nested job create request "nas.Server.modify" may include: {
 "name": " . . . ",
 "object": "nasServer",
 "action": "modify",
 "parametersIn": {
  "id": "<id>", . . . .

The jobTaskRequest embedded object includes the object parameter "nasServer", the action parameter "modify", and the parameters-in parameter "id".

In addition, the individual job requests within the composite request body 306 may be correlated to each other by pipelining the output of one or more of the nested job create requests as input for one or more other nested job create requests. In a non-limiting example, an output parameter of the job associated with job create request A 310 may be passed to input parameters of both job create request B 312 and job create request D 316.

Moreover, a nested job request may receive input from two or more other jobs in the plurality of nested job create requests 308. For example, job request D may receive an output parameter from a job associated with job request A 310 as well as an output parameter from a job associated with job request B 312.

Figure 4:
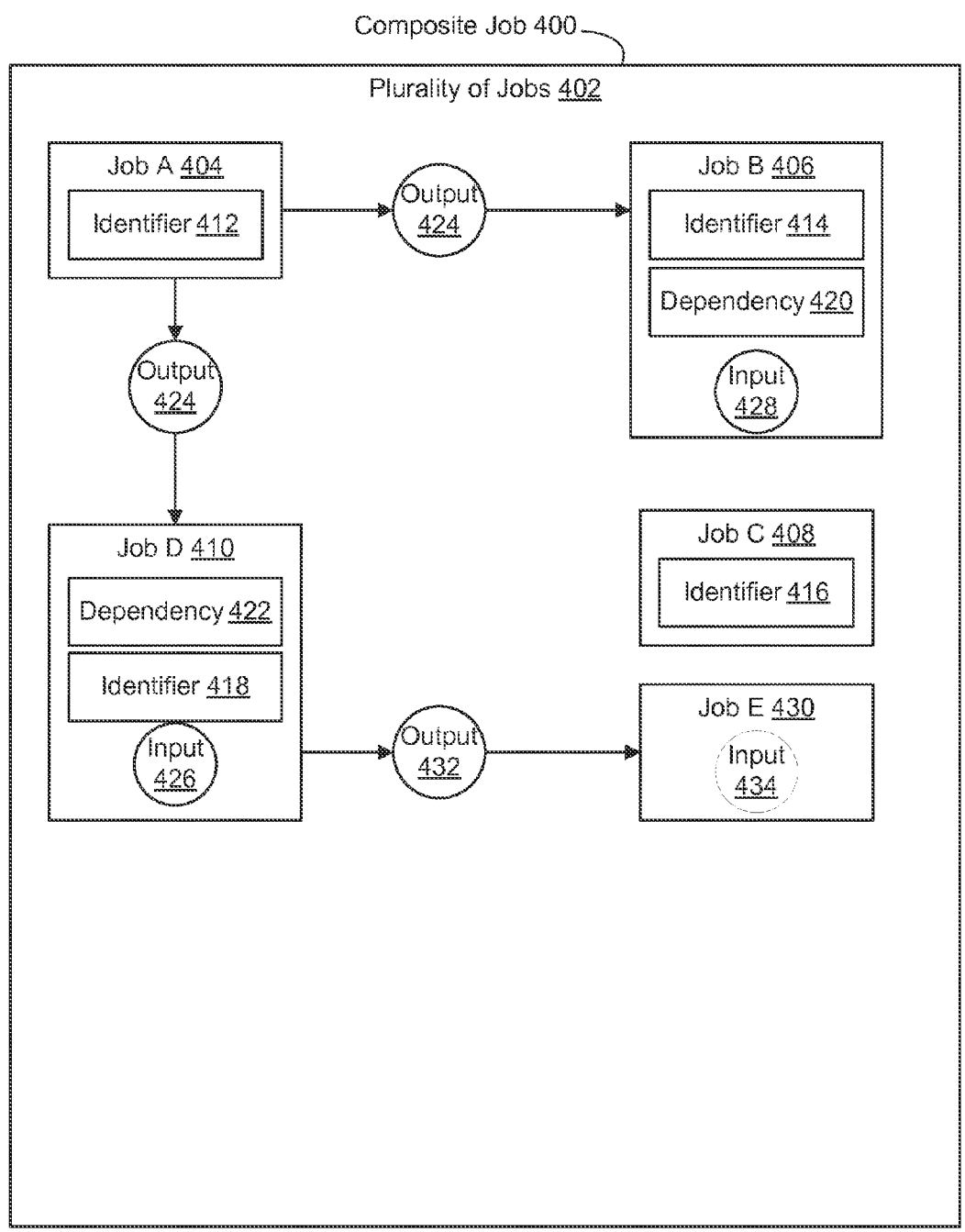
FIG. 4 is an exemplary block diagram illustrating a composite job on a server.

Referring now to FIG. 4, an exemplary block diagram illustrating a composite job request is shown. The server receives the composite request 200, parses the composite request, and generates a composite job 400 corresponding to the composite request 200. The composite job 400 is a job executes on the server, such as server 102.

The composite job 400 includes a plurality of jobs. Each job in the plurality of jobs corresponds to a nested job create request in the plurality of nested job create requests 308 associated with the composite request 200. In this example, the plurality of jobs 402 includes job A 404, job B 406, Job C 408, and job D 410.

The server returns a composite job identifier to the client. The client uses the composite job identifier to request a status of the composite job. In other examples, the composite job identifier may be implemented as a composite job name, a composite job description, or any other element that identifies the composite job.

Each job in the plurality of jobs includes an identifier. The identifier may also be implemented as a name, description associated with the job, or any other unique element within the composite job that identifies the individual job.

In this non-limiting example, job A 404 includes an identifier 412, job B 406 includes an identifier 414, job C 408 includes an identifier 416, and job D 410 includes an identifier 418.

The server executes each job in the plurality of jobs 402 of the composite job 400 in accordance with a dependency for each job. The dependency indicates whether a job requires output from another job in the plurality of jobs or if the job is otherwise required to execute serially after one or more other jobs have completed execution. The server may determine dependency of a job based on the parameters-in parameter for each job create request in the plurality of job create requests 308 of the composite request 200. In this example, job B 406 also has a dependency 420 on output 424 from job A 404. Job D 410 also has a dependency 422 on output 424 from job A 404. In this case, job A 404 and job C 408 do not have dependencies on any other job, therefore, job A 404 and job C 408 may optionally be executed concurrently.

However, job B 406 and job D 410 are dependent upon output 424 from job A 404. Therefore, job B 406 and job D 410 are not executed until after job A 404 is executed. After job A 404 completes execution, the output 424 of job A is passed to job B 406 as input 428 to job B 406. The output 424 of job A is also passed as input 426 to job D 410.

If the plurality of jobs 402 further includes a job E 430 which is dependent upon output 432 generated by job D 410, then job E 430 is not executed until after both job A 404 and job D 410 have completed execution. The output 432 of job D 410 is then passed to job E 430 as input 434 to job E.

In other examples, a job may be dependent on another job because of a user selection to make the job dependent without regard to a requirement for output from another job. In these cases, the server may determine a job is dependent on one or more other jobs based on the explicit dependency selected by a user. An explicit dependency is a dependency that is specified by the user rather than a dependency based on required inputs to the job. For example, job C 408 in this example is not dependent on output from any other job. However, a user may specify that job C is dependent on job E 430. In this case, job C 408 is not executed until after job E 430 completes execution even though job C 408 does not require output from job E 430 or any other job in the plurality of jobs.

The server tracks execution and status of the composite job 200 and each individual job within the plurality of jobs 402 associated with the composite job 400. The composite job status includes an execution status of each job in the plurality of jobs.

In some examples, when the execution of all the jobs in the plurality of jobs is complete, the server automatically returns a composite job status update to the client indicating the composite job execution is complete. In other examples, the client requests the composite job status update. In these examples, the server does not send the composite job status update until the server receives the request from the client. By polling the job instance of the composite job 400, the client is able to obtain the information for the composite request 400 and progress of execution of the entire composite request as well as the execution progress of each nested job in the plurality of jobs 402.

FIG. 5 is an exemplary composite request. The composite request 500 is a request to create a composite job on a server. The composite job 500 identifier in this example is "lun-Wizard" 502. The composite request includes a plurality of nested job create requests 504 encapsulated within the body of the composite request.

Element 506 is a nested job create request. The nested job create request 506 includes a name parameter "poolStep", an object parameter "pool" 510, an action parameter "create" 512, and parameters-in parameters. This job creates a pool associated with disk 19 of disk group 5.

Element 514 is a nested job create request having a name parameter "snapScheduleStep" 516, an object parameter "snapSchedule" 518, and an action parameter "create" 520. This job creates a snap schedule every eight hours.

Element 544 in this example is a nested job create request including a name parameter "lun1step" 524, an object parameter "storageResource" 526, and an action parameter "createLUN" 528 indicating that this job create request is requesting a job that will create a LUN associated with a storage resource.

Element 530 is a parameters-in parameter for the nested job create request 522. The parameters-in parameter indicates that the job corresponding to this job create request will be dependent on output 534 received from the "poolstep" job associated with nested job create request 506 and output 532 received form a job corresponding to the "snapScheduleStep" job create request 514. In other words, this job 530 is dependent on output from two other jobs in the plurality of jobs for the composite job. The dependencies in this example indicate that the pool associated with "poolStep" 506 will be created first, then a LUN associated with "lun1step" 522 will be created on the pool.

In this example, the client passes the output of one nested job create request, such as "poolStep" 506, to the input of another nested job create request by using the "@" notation, as shown at 532 and 534. For example, the notation:
"@<job task request name>.<out parameter name>"
contains a job task request name and out parameter name that is to replace the value part of an input parameter. This means the specified nested job create request will be executed prior to this nested job create request. The value of the specified output parameter will be used as an input value for this nested job create request. The composite request 200 may use this notation to establish dependencies.

The details of each job task request execution are encapsulated in the jobTask instance, which contains input and out parameters for each request. The input parameters contain "@" notation before request execution, because the client and/or server does not know which value will be used at the time of execution. The inputs parameters are substituted with real values passed by other nested job create requests during runtime.

A nested job create request may depend on zero or more other nested job create request. A nested job create request may be dependent by zero or more other nested job create requests. In some examples, the server analyzes the dependencies of each nested job create request and execute them in proper order serially or concurrently.

On request execution error, messages other than output parameters will be populated in the job task instance, just like in the case of primitive REST API request failure. If a nested job create request fails, all the requests that have dependency on that failed nested job create request, no matter directly or transitively, will not be executed because one or more of their input parameters will not have a value.

Referring now to FIGS. 6A and 6B, an exemplary composite job instance is depicted. FIGS. 6A and 6B illustrate a current state of a composite job that is available to the client by a GET request of the composite job resource's URL. In other words, a user may request the current state or status of the composite job by sending a GET request to the server that received and processed composite request 500 to create the composite job.

The composite job status 600 includes a URL 602 identifying a location of a resource. The URL specifies fields such as tasks 608, progress 606, state, and elapsed time 604, which are included within the composite job instance.

The composite job includes a plurality of jobs or tasks 608. Element 610 is a nested job identified as "snapSchedule" job corresponding to the "snapSchedule nested job create request 514 in the composite request 500. The "snapSchedule" job 610 is not dependent on any other jobs in the plurality of jobs.

Element 616 is another nested job in the plurality of jobs identified as "poolStep" 618 for creating a pool. The job in the plurality of jobs corresponding to the "poolStep" nested job create request 508 in composite request 500. The "poolStep" job is not dependent on any other jobs in the plurality of jobs. Therefore, in this example, the "snapSchedule" job 610 and the "poolStep" job may be executed by the server concurrently.

Element 620 is a job in the plurality of jobs identified as "lun1step" 622 for creating a LUN on a storage resource. The "lun1step" corresponds to the nested job create request 522 in composite request 500. The "snapScheduleStep" 610 is executed prior to the "lun1step" 620. When the snapScheduleStep 610 completes execution, the output 632 of "snapScheduleStep" 610 is passed as input to parameters-in 624 of "lun1step". Here, the output 632 of "snapScheduleStep" job 610 is passed as snapScheduleParameters" 626 as "snapSch_5" for snap schedule 5.

Likewise, the "poolStep" job 616 is executed prior to the "lun1Step" job 620. The output 634 of "poolStep" job 616 is passed to the input parameters-in parameter 628 of "poolStep" job 616.

In this example, the composite job creates one pool, a LUN, and creates a new snap schedule which is attached to the LUN. The client can request and receive a single status response that includes an execution progress of the composite job and/or each individual job in the plurality of jobs associated with the composite job. The composite job identifier 630 in this example, is "id":"B-17". The client may request status updates for this composite job by including the composite job identifier 630 in the request.

Figure 7:
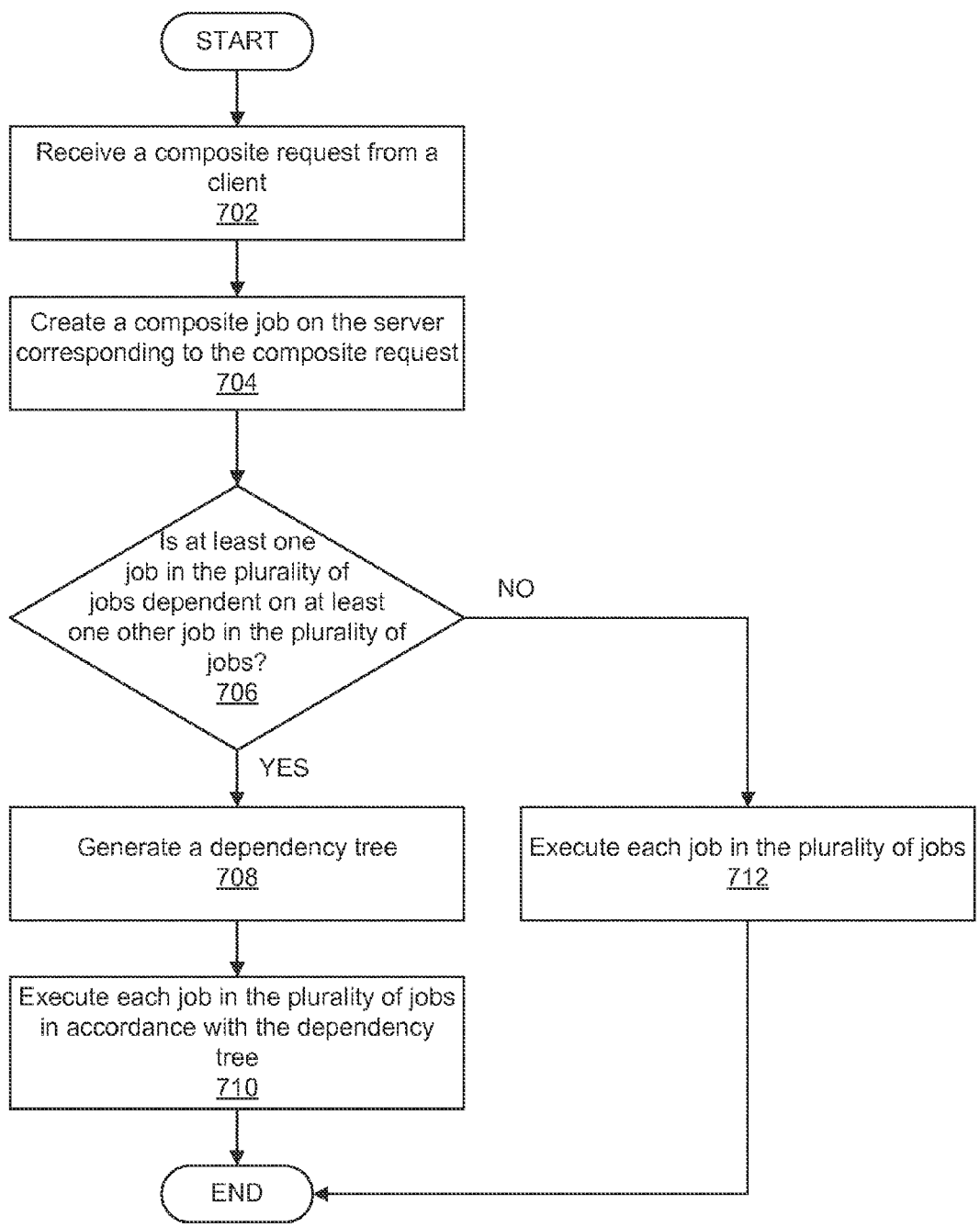
FIG. 7 is a flow chart illustrating operation of the computing device to implement a composite job request.

FIG. 7 is a flow chart illustrating operation of the computing device to implement a composite job request. The process depicted in FIG. 7 may be implemented by a computing device, such as, but without limitation, server 102 in FIG. 1.

The process begins by receiving a composite request from a client (operation 702). The process creates a composite job corresponding to the composite request on the server (operation 704). The composite job includes a plurality of jobs. A determination is made as to whether at least one job in the plurality of jobs associated with the composite job is dependent on at least one other job in the plurality of jobs (operation 706). If yes, the process generates a dependency tree (operation 708). The process executes each job in the plurality of jobs in accordance with the dependency tree (operation 710) with the process terminating thereafter.

Returning now to operation 706, if none of the jobs in the plurality of jobs is dependent on at least one other job in the plurality of jobs, the process executes each job in the plurality of jobs (operation 712) without regard to a dependency tree. The process terminates thereafter.

Figure 8:
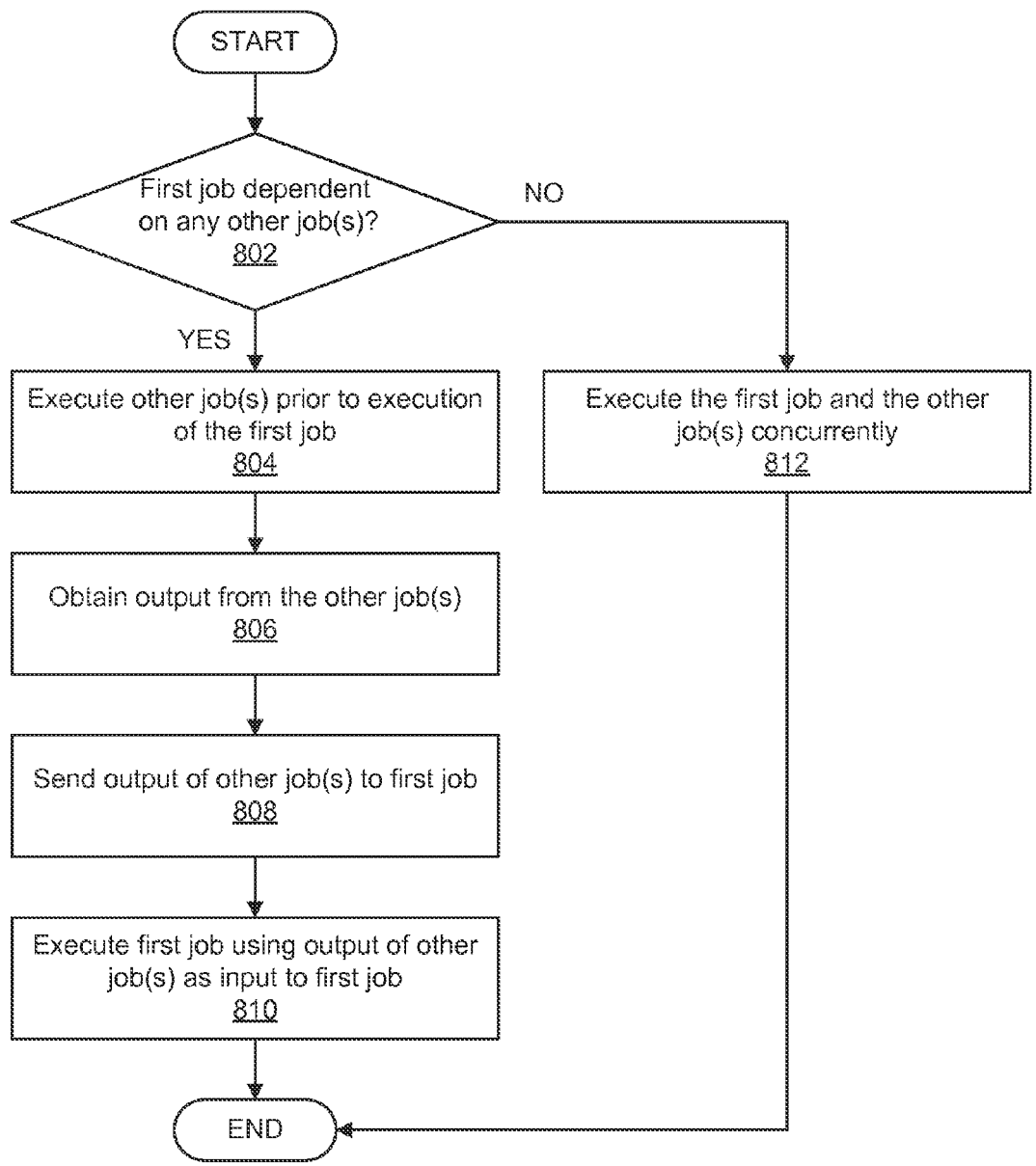
FIG. 8 is a flow chart illustrating operation of the computing device to execute a composite job in accordance with a dependency of each job associated with the composite job.

Referring now to FIG. 8, a flow chart illustrating operation of the computing device to execute a composite job in accordance with a dependency of each job associated with the composite job is shown. The process depicted in FIG. 8 may be implemented by a computing device, such as, but without limitation, server 102 in FIG. 1.

The process begins by determining whether a first job in a plurality of jobs is dependent on one or more other job(s) in the plurality of jobs (operation 802). If yes, the process executes the other job(s) prior to execution of the first job (operation 804). The process obtains output from the other job(s) job (operation 806). The process sends the output from the other job(s) job to the first job (operation 808). The process executes the first job using the output from the other job(s) as input to the first job (operation 810). The process terminates thereafter.

Additional Examples

In some examples, the process generates a dependency tree. The dependency tree indicates which jobs in the plurality of jobs are dependent on one or more other jobs in the plurality of jobs. On determining that the dependency indicates a first job in the plurality of jobs is dependent on a second job in the plurality of jobs, the server executes the second job prior to executing the first job and passes the output of the second job as an input to the first job.

In some examples, a system management component tracks the current status of the composite request at the server. The current status of the composite request includes a status of each job in the plurality of jobs and an execution progress of each job in the plurality of jobs. The system management component returns the current status of the composite request to the client on determining a request for a status update for the composite request has been received from the client. The status of a job in the plurality of jobs may include, for example and without limitation, at least one of a job queued state, a job running state, a job suspended state, a job completed state, or a job failed state.

In still other examples, the system management component of a server generates the dependency tree during composite job runtime. The dependency tree includes a set of jobs in the plurality of jobs to be executed serially. The dependency tree specifies a set of jobs in the plurality of jobs to be executed concurrently.

At least a portion of the functionality of the various elements in FIGS. 1 and 2 may be performed by other elements in FIG. 1 or FIG. 2, or an entity (e.g., processor, web service, server, application program, computing device, etc.) not shown in FIG. 1 and/or FIG. 2.

In some examples, the operations illustrated in FIGS. 7 and 8 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While aspects of the disclosure have been described in terms of various examples with their associated operations, a person skilled in the art would appreciate that a combination of operations from any number of different examples is also within scope of aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable program code, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable program code, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer executable program code, such as program modules, executed by one or more computers or other devices in software, firmware, hardware, or a combination thereof. The computer executable program code may be organized into one or more computer executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer executable program code or the specific components or modules illustrated in the figures and described herein. Other examples of the disclosure may include different computer executable program code or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein, but within the scope of aspects of the disclosure, constitute exemplary means for implementing REST API queries and query responses. For example, the elements illustrated in FIG. 1, such as when encoded to perform the operations illustrated in FIG. 7 and FIG. 8, constitute exemplary means for generating composite requests, processing composite requests, and executing composite jobs.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A server comprising:
   at least one processor;
   a memory storage device associated with the at least one processor, the memory storage device comprising a memory area storing a system management component, wherein the at least one processor executes the system management component to:
      process a composite hypertext transfer protocol (HTTP) POST job request, the composite HTTP POST job request comprising a plurality of nested job create requests, the plurality of nested job create requests defining a plurality of jobs, respectively, to be performed on one or more management resources of a data storage system;
      create a composite job in accordance with the composite HTTP POST job request on at least one data storage system server, the composite job comprising the plurality of jobs to be performed on the one or more management resources, each job in the plurality of jobs corresponding to a respective nested job create request in the plurality of nested job create requests, the composite job having a single composite job identifier for tracking execution progress of the composite job and each job in the plurality of jobs corresponding to the respective nested job create request;
      execute the composite job, by the at least one processor, in accordance with a dependency for each job in the plurality of jobs associated with the composite job; and
      upon determining that the dependency indicates a first job in the plurality of jobs is dependent on a second job in the plurality of jobs, execute the second job prior to executing the first job and pass an output of the second job as an input to the first job,
   wherein the composite HTTP POST job request further comprises:
      a composite request HTTP header; and
      a composite request uniform resource locator (URL),
      wherein the at least one processor executes computer executable program code to apply the composite request HTTP header and the composite request URL to each nested job create request in the plurality of nested job create requests, and
      wherein each nested job create request in the plurality of nested job create requests share a same HTTP header and URL provided for the composite HTTP POST job request.

2. The server of claim 1, wherein a nested job create request in the plurality of nested job create requests are encapsulated within a body of the composite HTTP POST job request, and wherein each nested job create request comprises a set of parameters, the set of parameters further comprising:
   a name parameter, the name parameter specifying a name of a nested job corresponding to the nested job create request that is unique within the composite HTTP POST job request;
   an object parameter, the object parameter specifying a target object name of the nested job create request;
   an action parameter, the action parameter specifying a target action name of the nested job create request;
   a parameters-in parameter, the parameters-in parameter specifying an output from at least one job that is required as input to the nested job corresponding to the nested job create request; and
   a parameters-out parameter, the parameters-out parameter specifying an output to be generated by the nested job corresponding to the nested job create request.

3. The server of claim 1, further comprising:
   a representational state transfer (REST) application programming interface (API), wherein the composite job identifier is returned to a client via the REST API.

4. The server of claim 1, wherein the at least one processor further executes the system management component to:
   track a current status of the composite HTTP POST job request at the at least one data storage system server, wherein the current status of the composite HTTP POST job request comprises a status of each job in the plurality of jobs and an execution progress of each job in the plurality of jobs;
   receive a composite job status update request from a client, the composite job status update request comprising the composite job identifier; and
   return the current status of each job in the composite job to the client in response to the composite job status update request.

5. The server of claim 4, wherein the data storage system is a cloud storage system, wherein the composite HTTP POST job request comprises two or more tasks to be performed on cloud storage, and wherein a status of a job in the plurality of jobs comprises at least one of a job queued state, a job running state, a job suspended state, a job completed state, or a job failed state.

6. A computer-implemented method for consolidating tasks into a composite job, the method comprising:
receiving a composite hypertext transfer protocol (HTTP) POST job request via an application programming interface of a computing device associated with a data storage system, the composite HTTP POST job request comprising a plurality of nested job requests encapsulated within a body of the composite HTTP POST job request, the plurality of nested job requests comprising a set of parameters defining a plurality of individual jobs, respectively, to be performed on one or more management resources of the data storage system;
creating a composite job corresponding to the composite HTTP POST job request, the composite job comprising the plurality of individual jobs to be performed on the one or more management resources, each individual job in the plurality of individual jobs corresponding to a respective nested job request in the plurality of nested job requests, and the composite job having a single composite job identifier for tracking execution progress of the composite job and each individual job in the plurality of individual jobs corresponding to the respective nested job request;
generating a dependency tree;
executing each individual job in the plurality of individual jobs associated with the composite job, by a processing device, in accordance with the dependency tree, the composite HTTP POST job request further comprising a composite request HTTP header, and a composite request uniform resource locator (URL); and
applying the composite request HTTP header and the composite request URL to each nested job request in the plurality of nested job requests, each nested job create request in the plurality of nested job create requests sharing a same HTTP header and URL provided for the composite HTTP POST job request.

7. The computer-implemented method of claim 6, wherein the composite job is created and executed on a data storage system server, and further comprising:
tracking an execution progress of the composite job, wherein tracking the execution progress of the composite job further comprises tracking an execution progress of each individual job in the plurality of individual jobs; and
on determining a request for a status update for the composite HTTP POST job request has been received from a client, returning a current status of the composite job to the client, wherein the request for the status update comprises the composite job identifier, and wherein the composite job status comprises a status and a progress of execution of each individual job in the plurality of individual jobs executing on the server.

8. The computer-implemented method of claim 6, further comprising:
generating the dependency tree during runtime, wherein the dependency tree comprises a first set of jobs in the plurality of individual jobs to be executed serially, and wherein the dependency tree specifies a second set of jobs in the plurality of individual jobs to be executed concurrently.

9. The computer-implemented method of claim 6, further comprising:
receiving the composite HTTP POST job request via an application programming interface of a cloud server, wherein the data storage system is a cloud storage system, wherein the composite HTTP POST job request comprises two or more tasks to be performed on cloud storage;
processing the composite HTTP POST job request by the processing device of the cloud server; and
returning a composite job update to a client, via the application programming interface, the composite job update comprising a status of each individual job in the plurality of individual jobs.

10. The computer-implemented method of claim 6, wherein the application programming interface is a representation state transfer (REST) application programming interface.

11. The computer-implemented method of claim 6, wherein executing each individual job in the plurality of individual jobs further comprises:
on determining a first job in the plurality of individual jobs is dependent upon a second job in the plurality of individual jobs, executing the second job prior to execution of the first job;
obtaining an output from the second job at completion of execution of the second job to form a second job output;
sending the second job output to the first job, wherein the second job output is an input to the first job; and
executing the first job serially after execution of the second job.

12. The computer-implemented method of claim 11, further comprising:
on determining a third job in the plurality of individual jobs is dependent upon the first job, executing the first job prior to beginning execution of the third job;
obtaining an output from the first job at completion of execution of the first job to form a first job output;
sending the first job output to the third job, wherein the first job output is an input to the third job; and
executing the third job after completion of execution of the first job.

13. The computer-implemented method of claim 6, further comprising:
receiving an explicit dependency for a selected job, wherein the explicit dependency is a user selected dependency indicating that the selected job is dependent on at least one individual job in the plurality of individual jobs; and
executing the selected job after execution of the at least one individual job.

14. One or more computer storage media embodying computer executable components, said components comprising a systems management component that, when executed, cause at least one processor to:
parse a composite hypertext transfer protocol (HTTP) POST job request received from a client, the composite HTTP POST job request comprising a plurality of nested job requests, the plurality of nested job requests defining a plurality of nested jobs, respectively, to be performed on one or more data storage system resources;
generate a composite job corresponding to the composite HTTP POST job request, the composite job comprising the plurality of nested jobs to be performed on the one or more data storage system resources, each nested job in the plurality of nested jobs corresponding to a respective nested job request in the plurality of nested job requests;

return a composite job identifier to the client, the composite job identifier for tracking execution progress of the composite job and each nested job in the plurality of nested jobs corresponding to the respective nested job request, the composite job identifier identifying the composite job;

track execution of the composite job to form a composite job status, the composite job status including an execution status of each nested job in the plurality of nested jobs;

return the composite job status to the client in response to receiving a composite job status update request, the composite job status comprising a current execution status of each nested job in the plurality of nested jobs, the composite job update request comprising the composite job identifier;

return a composite job complete status to the client on determining execution of the plurality of nested jobs is complete, the composite HTTP POST job request further comprising a composite request HTTP header, and a composite request uniform resource locator (URL); and apply the composite request HTTP header and the composite request URL to each nested job request in the plurality of nested job requests, each nested job request in the plurality of nested job requests sharing a same HTTP header and URL provided for the composite HTTP POST job request.

15. The one or more computer storage media of claim 14, wherein the composite HTTP POST job request comprises two or more tasks to be performed on cloud storage, and wherein the system management component is further executed to cause the at least one processor to:

re-start execution of one or more jobs on a cloud server associated with the cloud storage on determining that the execution of the one or more jobs in the plurality of nested jobs is interrupted.

16. The one or more computer storage media of claim 14, wherein the composite HTTP POST job request is received from the client via a representational state transfer (REST) application programming interface.

17. The one or more computer storage media of claim 14, wherein a first job is dependent on a second job, and wherein the wherein the system management component is further executed to cause the at least one processor to:

execute the second job prior to execution of the first job; and pass an output of the second job to the first job, wherein the second job output is an input to the first job.

18. The one or more computer storage media of claim 17, wherein a third job is dependent on the first job and the second job, wherein the first job, second job, and third job are executed serially, and wherein the system management component is further executed to cause the at least one processor to:

execute the first job prior to execution of the third job;

pass an output of the second job to the third job, wherein the second job output is a first input to the third job; and pass an output of the first job to the third job, wherein the first job output is a second input to the third job.

19. The one or more computer storage media of claim 14, wherein a first job in the plurality of nested jobs is free of dependencies on any other job in the plurality of nested jobs, wherein a second job in the plurality of nested jobs is also free of dependencies on any other jobs in the plurality of nested jobs, and wherein the system management component is further executed to cause the at least one processor to:

execute the first job and the second job concurrently.

20. The server of claim 1, wherein the composite HTTP POST job request has a body, and wherein the at least one processor further executes the system management component to:

encapsulate the plurality of nested job create requests within the body of the composite HTTP POST job request; and submit the composite HTTP POST job request to the one or more management resources for processing of the encapsulated nested job create requests.

* * * * *